Oct. 2, 1951  B. E. MILLS  2,569,486
BEVERAGE VENDING MACHINE
Filed July 20, 1945  3 Sheets-Sheet 1
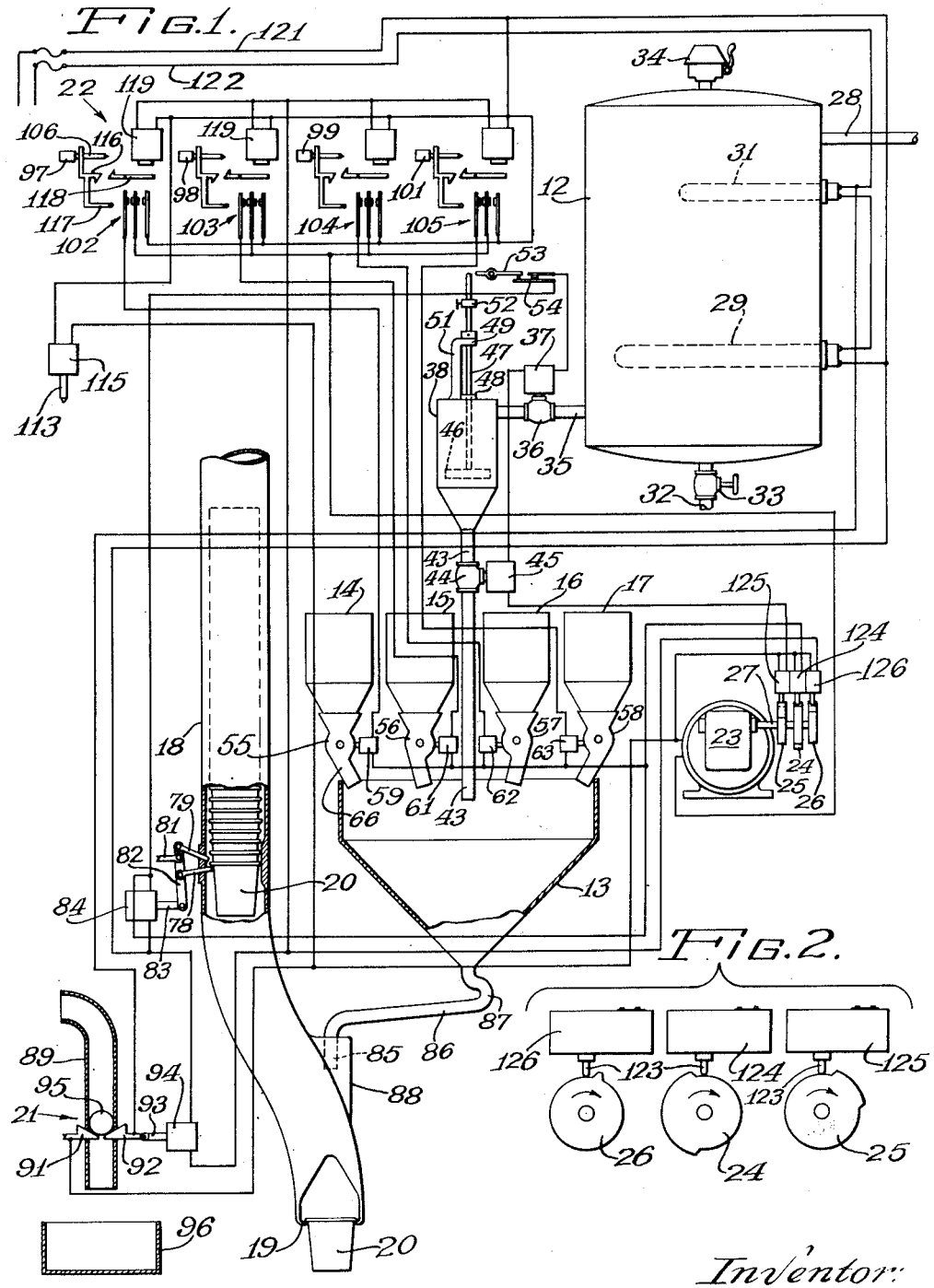
Inventor:
Bert E. Mills
By Carl W. Lloyd
Attorney Oct. 2, 1951 B. E. MILLS 2,569,486
BEVERAGE VENDING MACHINE
Filed July 20, 1945 3 Sheets-Sheet 2
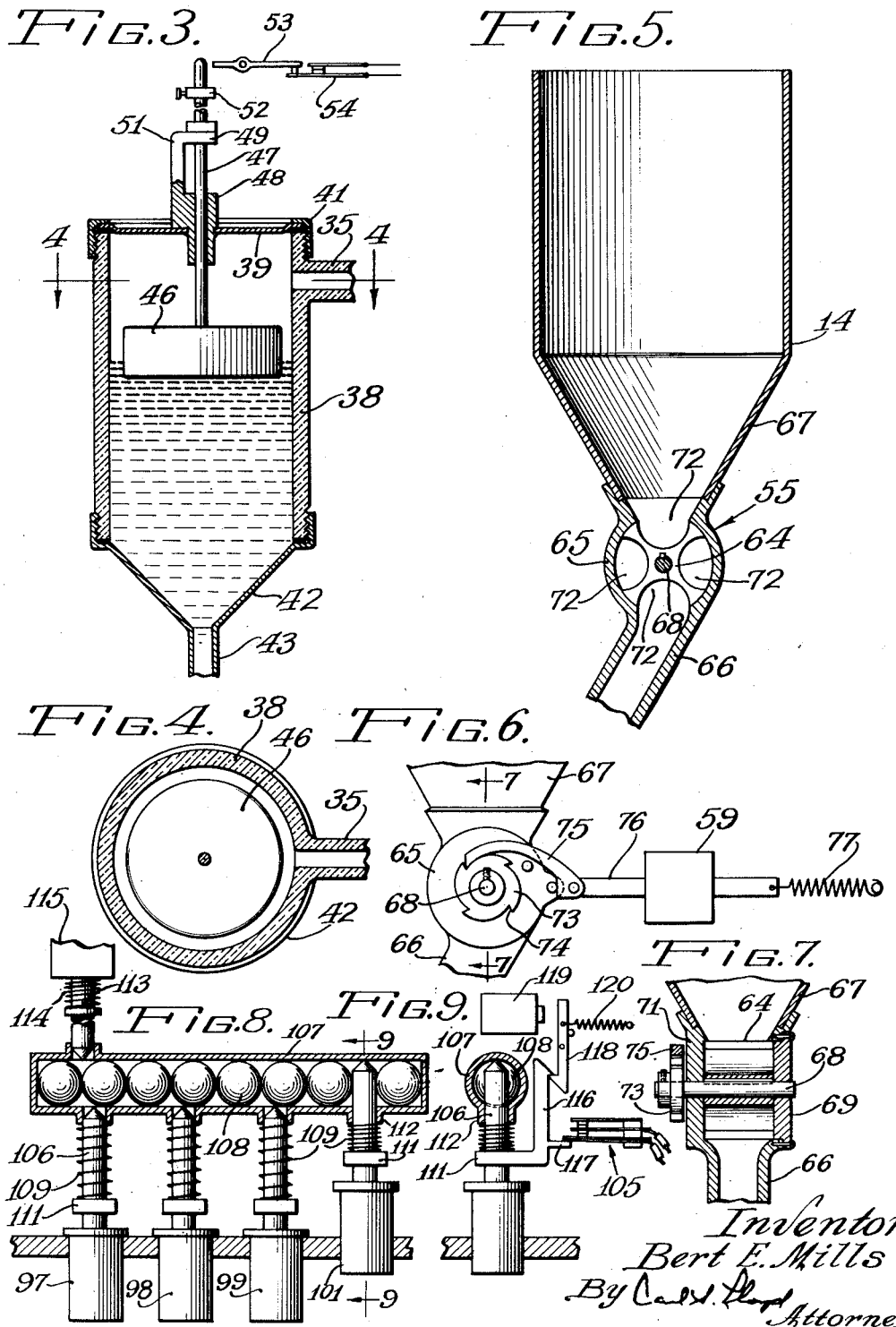
Inventor:
Bert E. Mills
By [signature]
Attorney Oct. 2, 1951    B. E. MILLS    2,569,486
BEVERAGE VENDING MACHINE
Filed July 20, 1945    3 Sheets-Sheet 3
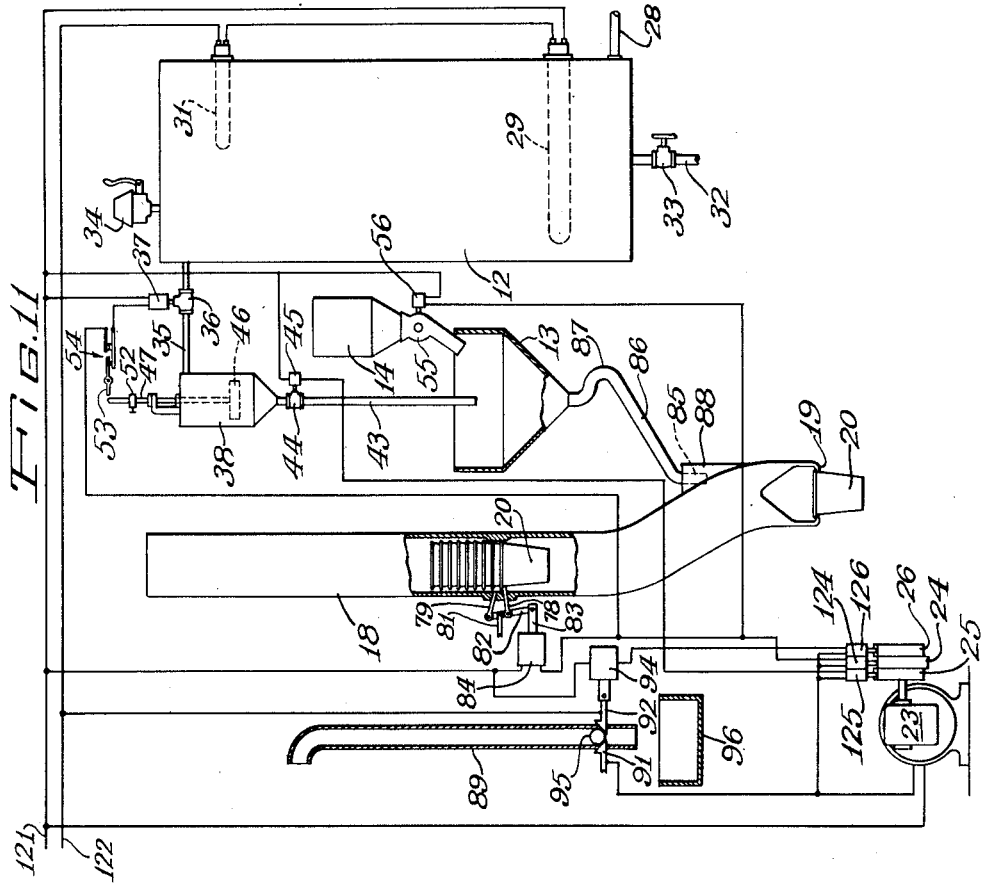
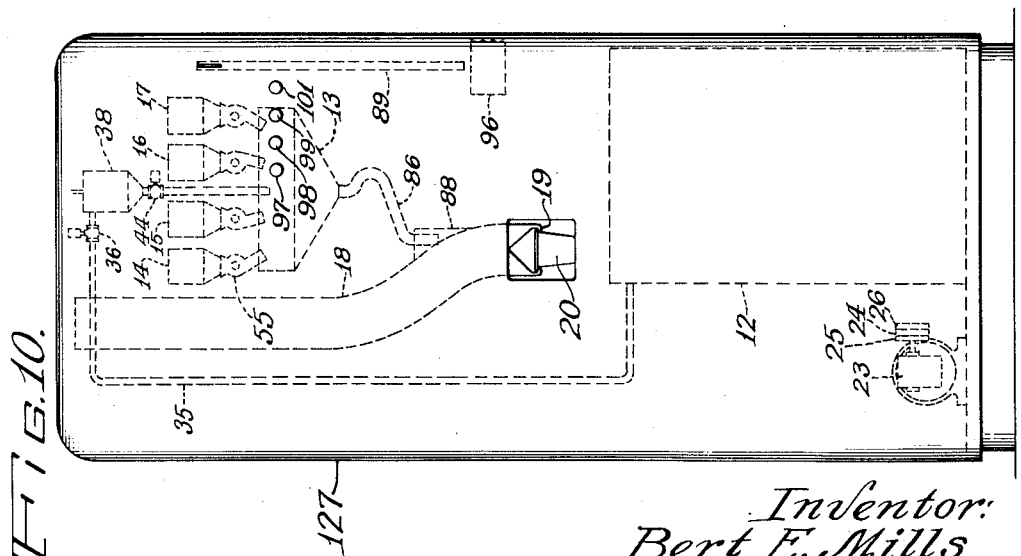
Inventor:
Bert E. Mills
By [signature]
Attorney Patented Oct. 2, 1951

2,569,486

UNITED STATES PATENT OFFICE 2,569,486

BEVERAGE VENDING MACHINE

Bert E. Mills, St. Charles, Ill., assignor to The Bert Mills Corporation, Chicago, Ill., a corporation of Illinois Application July 20, 1945, Serial No. 606,263

4 Claims. (Cl. 225—21)

This invention relates to a beverage vending machine and has for its general object the provision of a machine for automatically preparing and dispensing a mixed beverage, such as coffee, at proper temperature, preferably in response to the deposit of a coin in the machine.

An important object of the invention is the provision of such machine in which the customer may have a choice of any one of a number of kinds of beverages which may be selected by means of a selector mechanism operable in conjunction with the coin control to cause mixing and delivery of the selected beverage. If the machine is used for vending coffee, for example, the choice may be as between black coffee, coffee with sugar, coffee with milk, or coffee with both sugar and milk. Also it may be adapted for vending different beverages, such as coffee, cocoa, postum or some other pre-prepared composition which is initially in dehydrated form; or it might be used for other products such as certain kinds of soup.

A further object is the provision in such a machine of electrically controlled means for effecting delivery of the components of the chosen drink to a mixing receptacle and the discharge of the mixed drink into an automatically positioned cup in proper sequence and in controlled manner so that the machine may be quickly and simply operated and will be certain and efficient in action.

Another object is to provide a selector mechanism especially adapted to the purposes of a machine of this character.

With these and other objects in view the invention resides in the general combination of elements and the particular features of construction hereinafter described and claimed, an illustrative embodiment thereof being shown in the accompanying drawings, in which:

Fig. 1 is a schematic view of the elements of a selective vending machine embodying the invention, including a wiring diagram showing the hookup of the various electrical elements;

Fig. 2 is a diagrammatic view of certain operating cams employed in the machine, the same being shown in disassembled relationship;

Fig. 3 is a vertical sectional view of a measuring vessel for water or other liquid used in the making of the beverage to be vended;

Fig. 4 is a horizontal sectional view of said measuring vessel taken substantially on the line 4—4 of Fig. 3;

Fig. 5 is a vertical sectional view of a container for a powdered or comminuted ingredient of the drink showing at the bottom thereof a measuring dispenser whereby a predetermined quantity of such ingredient may be delivered for mixing with the water upon each operation of the machine;

Fig. 6 is a side elevational view of said measuring dispenser, showing the operating means therefor;

Fig. 7 is a sectional view of said dispenser taken substantially on the line 7—7 of Fig. 6;

Fig. 8 is a horizontal sectional and plan view of certain parts of a selector mechanism employed in the machine;

Fig. 9 is a sectional view taken substantially on the line 9—9 of Fig. 8, showing one of the selector elements in greater detail;

Fig. 10 is a front elevational view of a machine in which the invention is embodied; certain of the interior parts being shown in dotted lines; and Fig. 11 is a schematic view and wiring diagram of a modified construction in which the selector is omitted and the machine is adapted for vending only one type of beverage.

Referring first to Fig. 1, I have shown in somewhat diagrammatic arrangement a water tank 12, a mixing receptacle 13, a plurality of containers 14, 15, 16 and 17 for alternative beverage ingredients, which normally will be in powdered or granulated form, and a cup magazine 18 with a holder 19 for a cup to be filled at the lower end thereof. The coin control is generally indicated at 21 and the selector mechanism at 22. The machine is operated by means of a motor 23 and a series of cams 24, 25 and 26 mounted on a motor driven shaft 27.

Water is admitted to the tank 12 through an inlet pipe 28 and provision is made for heating the water by means of an electric heating element 29, in connection with which there is a thermostatic control device 31 of well known type adapted to control the supply of electrical energy to the element 29 to maintain a desired temperature of the liquid. A drain pipe 32 is provided at the bottom of the tank, with a manually operated valve 33 therein, and a relief valve 34 is positioned at the top of said tank. An outlet pipe 35 is positioned, as shown in Fig. 1, near the bottom of the tank and has therein a valve 36 arranged to be operated by means of solenoid 37.

Said pipe 35 leads to a measuring vessel 38 which preferably is in the form of a glass cylinder with a top 39, clamped thereon by a threaded angle member 41, and a bottom member 42 of funnel shape which also is screwed onto the cylinder (see Fig. 3). Said member 42 has a pipe 43 depending therefrom and opening into the mixing receptacle 13, a valve 44 being provided in said pipe and arranged to be operated by a solenoid 45. A float 46 is positioned in the vessel 38 and has a stem 47 extending upwardly therefrom through collar portions 48 and 49 of a bracket 51. Said stem 47 has a shoulder member 52 thereon adapted to engage an end of a pivoted lever 53 which serves to open a cut-off switch 54 when the float 46 rises to a certain point. The amount of liquid drawn from the tank 12 on each operation of the machine may be thus be limited to a predetermined amount, and the measured quantity of liquid is held in the vessel 38 until the valve 44 is opened in manner which will be hereinafter described.

Each of the containers 14–17, inclusive, for the powdered or comminuted ingredient of the beverage each has a dispenser at the bottom thereof, said dispensers being identified by the numerals 55, 56, 57 and 58, respectively.

As shown in Figs. 5–7, inclusive, each dispenser comprises a rotary member 64 positioned in an enlarged, generally cylindrical portion 65 of a spout 66 connected to the bottom of a funnel-shaped portion 67 of the container 14, etc. The member 64 is mounted on a shaft 68 extending through end plates 69 and 71 provided on the part 65 of the spout member. Said member 64 has a number (four as shown) of pockets 72 in the periphery thereof for receiving a charge of the beverage ingredient contained in the container 14, etc., and said member 64 is adapted to be turned a quarter-turn on each operation by means of a pawl-and-ratchet mechanism shown in Fig. 6. Said mechanism comprises a ratchet wheel 73, having four teeth 74 therein, and a pawl 75 mounted on an armature 76 of the solenoid 59, etc. Said armature is in the form of a rod which may be slidably mounted in the machine in any suitable manner and has a spring 77 connecting the outer end thereof with a fixed point on the machine. The pawl 75 will thus be advanced once upon each energization of the solenoid 59 and will be retracted when the armature rod 76 is moved to the right (viewing Fig. 6) by the spring 77 when the solenoid is deenergized.

The cups marked 20, are adapted to be individually released at the proper time by means of fingers 78 and 79 (see Fig. 1) positioned, respectively, below and above a pivot 81 of an arm 82 carried at the end of an armature 83 of a solenoid 84 by which the cup releasing mechanism is operated. A cup, when released, drops into the holder 19 which is beneath an outlet end 85 of a pipe 86 leading from the funnel-shaped mixing receptacle 13. Said pipe 86 has a bend 87 therein near the outlet of the receptacle 13 to prevent the powder from passing freely therethrough before the water is admitted to said receptacle 13. The end 85 of the pipe 86 enters a lateral enlargement 88 on the lower part of the cup magazine 18, the latter being curved as shown in Fig. 1 so that the cup when in the holder 19 will be directly below said outlet end 85 of the pipe 86.

The coin control mechanism is shown diagrammatically as comprising a coin chute 89 with two coin-supporting members, marked 91 and 92, in the lower part thereof, the member 92 being slidably mounted and being attached to an armature 93 of a solenoid 94. Said members 91 and 92, which are made of conductive material, are arranged to support a coin 95, which electrically bridges the gap therebetween, and when the member 92 is withdrawn by the solenoid 94 the coin will drop into a cash box 96. Of course this showing is purely schematic and any suitable mechanical adaptation of the coin control may be employed, no invention being here claimed in the coin mechanism per se.

The selector mechanism 22, as shown, comprises four substantially identical units selectively operable by means of push buttons marked 97, 98, 99 and 101, respectively. Said push buttons are arranged to operate switches 102, 103, 104 and 105, respectively, each of which comprises three contact members by which the necessary circuits are closed when one of the push buttons 97, etc. is depressed.

The mechanical construction of the selector units is shown in Figs. 8 and 9, from which it will be seen that each push button 97, etc. has a plunger 106 extending inwardly therefrom. Said plungers in the present instance have a pointed forward end extending into a ball cage 107 in which there are a number of balls 108. Each plunger 106 has a spring 109 mounted thereon between a collar 111 on the plunger and a projection 112 on the ball cage, said spring normally tending to hold the plunger and push button in the outer position.

The number and size of the balls in the cage 107 are such that only one of the plungers 106 can be moved into the cage at one time so that only a single selection can be made on one operation of the machine. Furthermore not even one can be inserted until a wedging plunger, 113 mounted at the rear of the cage and normally disposed therein, has been withdrawn. Said plunger 113 is normally held in wedging position by a spring 114 and is adapted to be withdrawn by means of a solenoid 115 which, as will later appear, is arranged to be energized by the closing of the coin contact.

Each of the plungers 106 carries a hook member 116 thereon, which may be integral with the collar 111, and said hook member carries a switch closing projection 117. When one of the plungers 106 is pressed inwardly the switch closing projection 117 will close the associated switch 105, etc. and the hook member 116 will engage a pivoted complementary hook member 118, normally urged toward engaging position by a spring 120. By this means the push button will be held in its inner position until the hook member 118 is caused to disengage the member 116, which is accomplished by means of a solenoid 119 positioned to attract, when energized, the free end of said member 118. Said solenoid is energized at the end of a cycle of operation of the machine as will later appear.

The electrical feed circuit is indicated at 121, 122, and the circuits therefrom to the various solenoids and switches will be indicated in the description of the operation to follow.

The cams 24, 25 and 26 are positioned to actuate plungers 123 of switches 124, 125 and 126, respectively.

The mechanism may be mounted in a cabinet 127 of any preferred form (see Fig. 10). As shown in Fig. 10, the liquid supply tank 12 is positioned in the lower part of the cabinet, in which case pressure of the liquid would force it through the pipe 35 to the valve 36 and vessel 38, but said supply tank may be positioned for gravity feed of the liquid as shown in Fig. 1.

In Fig. 11 a system similar to that of Fig. 1 is shown but with only one container and dispenser for the non-liquid ingredient of the beverage, and therefore with no selector mechanism.

It will be understood that when a substance such as sugar and/or milk is to be added to the coffee the dispenser pocket 72 will be somewhat larger than when black coffee is to be served, so that the same amount of coffee will be present in the charge in either case; and that when milk is included it will be in dehydrated form.

The operation of the apparatus shown in Fig. 1 is as follows:

Upon insertion of a coin in the coin chute 89 it falls upon the contacts 91, 92, bridging the gap there-between and closing the circuit to one side of the motor 23, while at same time energizing the solenoid 115 to withdraw the plunger 113 from the selector ball cage 107. One of the selector buttons or keys 97, etc. may then be depressed, closing the associated switch 102, etc. and completing the circuit to one of the dispenser solenoids 59, etc. and to the other side of the motor 23.

This causes rotation of the cam shaft 27, carrying the three cams 24, 25 and 26.

Cam 24 closes the switch 124, thereby energizing the cup delivery solenoid 84 and the water inlet solenoid 37. The latter remains energized until the plunger 123 of the switch 124 rides off the rise of the cam 24, thus opening said switch 124.

Cam 25 then closes the switch 126, energizing the discharge valve solenoid 45 causing a measured amount of liquid to flow downward into the mixing chamber 13 into which the powder will already have been delivered. The liquid will mix with the powder in said chamber 13 and in the pipe 86 and the mixed beverage will flow into the positioned cup 20.

Further rotation of the cam shaft causes the plunger 123 of the switch 125 to ride off the rise of the cam 25 thereby opening said switch and causing the discharge valve 44 to close.

Finally the cam 26 momentarily closes the switch 126, thereby energizing the coin release solenoid 94 and the selector releasing solenoid 119. This causes the coin to be released and to drop into the box 96, at the same time deenergizes the selector lock solenoid 115 as well as the release solenoid 119 so that the last-operated selector key may be withdrawn by its spring 109 and the wedging plunger 113 may be moved into the ball cage 107 to prevent further operation until another coin is inserted in the chute 87.

The float and rod assembly 46, 47 will cause the switch 54 to be opened when the liquid rises to a pre-determined point in the measuring vessel 38, thereby deenergizing the solenoid 37 and causing the inlet valve 36 to close.

The operation of the form of the apparatus shown in Fig. 11 is the same as has just been described in connection with Fig. 1, except that there is no selector mechanism involved and the cycle is simplified accordingly.

The foregoing detailed description has been given for clearness of understanding only, and no unnecessary limitations should be inferred therefrom, but the appended claims should be construed as broadly as permissible in view of the prior art.

I claim:

1. A drink vending machine comprising a storage tank for a beverage liquid, a measuring vessel communicably connected with said tank, a valve in the line of communication between said tank and vessel normally closing said line, a receptacle communicably connected with said measuring vessel, a valve in the line of communication between said vessel and receptacle normally closing said line, a drinking cup magazine, a cup holder arranged to receive a cup from said magazine and to hold it in position to be filled and to be removed by a customer, a plurality of containers for ingredients to be selectively mixed with the liquid to form a finished drink, each of said containers being arranged to communicate with said receptacle, a measuring dispenser at an outlet of each container, a conduit for conveying the liquid from said receptacle to the positioned cup, and electrically operated means including a motor, a series of cams operated by the motor, switches controlled by said cams, and a series of solenoids arranged to be energized by the closing of said switches for first releasing an individual cup for transfer to said holder, opening the valve in the line of communication between said tank and measuring vessel for a sufficient time to fill the vessel and then closing said valve, operating the dispenser of a selected container to discharge a measured quantity of one of said ingredients into the receptacle, and opening the valve in the line of communication between said measuring vessel and receptacle to permit passage of the measured amount of the liquid into the receptacle for mixing with said selected ingredient and for causing discharge of the mixed drink into the cup, said means for operating said second-mentioned liquid control valve being timed to cause liquid to flow into said receptacle after discharge of said second ingredient into the receptacle, and said receptacle and said conduit leading therefrom having downwardly inclined surfaces throughout, arranged to be thoroughly cleaned by such liquid flowing therethrough after such discharge of said second ingredient into said receptacle.

2. In a drink vending machine, the combination of a source of liquid supply, a plurality of sources of other ingredients adapted to be selectively mixed with the liquid to form a finished drink of selected type or flavor, a mixing receptacle, electrically operated devices for releasing a charge of the selected ingredient and a charge of the liquid into said receptacle, a selector mechanism for determining which of said ingredients shall be released for mixing with the liquid in said receptacle on any particular operation of the machine, coin-operated means operable in conjunction with said selector mechanism to cause operation of said releasing devices, means for conveying the mixed drink from said receptacle to a cup or the like accessible to the customer, said selector mechanism comprising a series of manually operable elements, one for each of said selectable ingredients, electrical means operable by the activated element for controlling the operation of the releasing device for the selected ingredient, and means for preventing operation of any of said elements until said coin-operated means has been activated by the insertion of a coin in the machine, said last-mentioned means comprising a series of movable blocking members displaceable by any one of said manual elements, when permitted a wedge member normally holding said members in blocking position and an electrical device energized by said coin-operated means when activated to withdraw said wedge member.

3. A drink vending machine comprising a storage tank for a beverage liquid, a measuring vessel communicably connected with said tank, a valve in the line of communication between said tank and vessel, a receptacle communicably connected with said measuring vessel, a valve in the line of communication between said vessel and receptacle, a drinking cup magazine, a cup holder arranged to receive a cup from said magazine and to hold it in position to be filled and to be removed by a customer, a container for a second ingredient of the beverage arranged to communicate with said receptacle, a measuring dispenser at an outlet of said container, a conduit for conveying the mixed drink from said receptacle to the positioned cup, and electrically operated means comprising sequentially operated switches, a solenoid in association with a retainer device for first releasing an individual cup for transfer to said holder, a solenoid operatively disposed to next open the valve in the line of communication between said tank and measuring vessel for a sufficient time to fill the vessel, another solenoid in cooperation with said dispenser for operating the same to discharge a measured quantity of said second ingredient into the receptacle, and a solenoid cooperatively arranged with the valve in the line of communication between said measuring vessel and receptacle for lastly opening said valve to permit passage of the measured amount of the liquid into the receptacle for mixing with said second ingredient and for causing discharge of the mixed drink into the cup.

4. A drink vending machine comprising a storage tank for a beverage liquid, a receptacle communicably connected with said tank, a valve in the line of communication between said tank and receptacle, a drinking cup magazine, a cup holder arranged to receive a cup from said magazine and to hold it in position to be filled and to be removed by a customer, a container for a second ingredient of the beverage arranged to communicate with said receptacle, a measuring dispenser at an outlet of said container, a conduit for conveying the mixed drink from said receptacle to the positioned cup, means for controlling the quantity of liquid withdrawn from said tank and conveyed to said receptacle on each operation of the machine, an electrically operated means comprising sequentially operated switches, a solenoid in association with a retainer device for first releasing an individual cup for transfer to said holder, a solenoid arranged to operate said dispenser to cause discharge of a measured quantity of said second ingredient into the receptacle, and a solenoid cooperatively arranged in relation to said valve in the line of communication between said tank and receptacle for opening the same to permit passage of the measured amount of liquid into the receptacle for mixing with said second ingredient and for causing discharge of said mixed drink into the cup.

BERT E. MILLS.

REFERENCES CITED

The following references are of record in the file of this patent:

UNITED STATES PATENTS

| Number | Name | Date |
|---|---|---|
| 893,343 | Meyer | July 14, 1908 |
| 1,668,540 | McAllen | May 1, 1928 |
| 1,789,064 | Borislavsky et al. | Jan. 13, 1931 |
| 2,284,880 | Nicholson | June 2, 1942 |
| 2,346,290 | Carlson | Apr. 11, 1944 |
| 2,376,403 | Thompson et al. | May 22, 1945 |
| 2,391,003 | Bowman | Dec. 18, 1945 |
| 2,403,470 | Tull | July 9, 1946 |
| 2,427,429 | Waite et al. | Sept. 26, 1947 |